(12) United States Patent
Hoshuyama

(10) Patent No.: US 7,684,559 B2
(45) Date of Patent: Mar. 23, 2010

(54) ACOUSTIC ECHO SUPPRESSOR FOR HANDS-FREE SPEECH COMMUNICATION

(75) Inventor: Osamu Hoshuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 1755 days.

(21) Appl. No.: 10/621,577

(22) Filed: Jul. 18, 2003

(65) Prior Publication Data

US 2004/0018860 A1    Jan. 29, 2004

(30) Foreign Application Priority Data

Jul. 19, 2002    (JP)    ............................ 2002-210915

(51) Int. Cl.
*H04M 9/08* (2006.01)
(52) U.S. Cl. ............................. 379/406.08; 379/406.14
(58) Field of Classification Search ............ 379/406.08, 379/406.14
See application file for complete search history.

(56) References Cited

U.S. PATENT DOCUMENTS

| | | | | |
|---|---|---|---|---|
| 5,937,060 | A * | 8/1999 | Oh | 379/406.14 |
| 6,108,413 | A * | 8/2000 | Capman et al. | 379/406.13 |
| 6,442,275 | B1 * | 8/2002 | Diethorn | 379/406.14 |
| 6,510,224 | B1 * | 1/2003 | Christensson et al. | 379/406.03 |
| 6,526,140 | B1 * | 2/2003 | Marchok et al. | 379/406.03 |
| 2003/0031315 | A1 * | 2/2003 | Belt et al. | 379/406.01 |

FOREIGN PATENT DOCUMENTS

| | | |
|---|---|---|
| JP | 11205199 | 7/1999 |
| JP | 2000-502520 | 2/2000 |
| JP | 2001-16142 | 1/2001 |
| JP | 2002-217793 | 8/2002 |
| JP | 2003-506924 | 2/2003 |

OTHER PUBLICATIONS

E. Hansler, "The hands-free telephone problem: an annotated bibliography update", Ann. Telecommun., 49, n° 7-8, (1994), pp. 360-367 with Abstract.
J. Shynk, "Frequency-Domain and Mutirate Adaptive Filtering", IEEE SP Magazine, (Jan. 1992), pp. 37.

* cited by examiner

*Primary Examiner*—Alexander Jamal
(74) *Attorney, Agent, or Firm*—Sughrue Mion, PLLC

(57) ABSTRACT

In a hands-free mode of speech communication, a loudspeaker produces acoustic energy of a distant signal from a far-end talker and a microphone produces a near-end signal containing a speech component representing the speech activity of a near-end talker or an acoustic echo component, or both. An echo replica is produced from the distant signal and a residual echo representing the difference between the near-end signal and the echo replica. The residual echo is used as a feedback signal to produce the echo replica. Using one of the near-end signal and the residual echo as a first input signal and the echo replica as a second signal, an estimate of the acoustic echo is produced when the speech activity of the near-end talker is low or zero. Using the acoustic echo estimate, the spectrum of the first input signal is shaped to produce a local signal for transmission to the far-end talker.

50 Claims, 13 Drawing Sheets

FOURIER COEFFICIENT MULTIPLIER

ACOUSTIC ECHO SUPPRESSOR FOR HANDS-FREE SPEECH COMMUNICATION

BACKGROUND OF THE INVENTION

1. Field of the Invention

The present invention relates to an echo suppressor for application to full-duplex speech communication such as hands-free telephony and voice recognition in a noisy environment. The present invention is particularly useful for applications where the acoustic echo path of a full-duplex speech communication system is severely affected by nonlinear distortion.

2. Description of the Related Art

In a full-duplex speech communication system such as a telephone or a notebook computer operating in a hands-free mode, distant signal from a far-end talker is transmitted from the loudspeaker 2 and some of the acoustic energy is sensed by the microphone 1 (FIG. 1). Acoustic echoes occur as a result of the distant signal from the loudspeaker 2 being coupled through a channel known as acoustic echo path to the microphone. The acoustically coupled distant signal is then coupled into the return path and propagates through the network to the far-end talker, giving an impression of an echo of the talker's voice. In order to cancel the echo, a linear echo canceller 3 is provided. As described in a technical paper "The hands-free telephone problem: an annotated bibliography updated", Eberhard Hansler, Annals of Telecommunications, 1994, pages 360-367, the linear echo canceller 3 has a replica of the transfer function of the acoustic echo path to produce an echo replica of distant signal. The echo replica is used in a subtractor 4, or residual echo detector to cancel the echo contained in the output of microphone 1, producing an echo-free local signal. A speech detector 5 is provided to monitor the outputs of echo canceller 3 and subtractor 4 as well as the local and distant signals for detecting speech activity of the near-end talker. Speech detector 5 produces a zero or a near-zero output when the near-end speech activity is high and a high-level output when it is low or zero.

The linear echo canceller 3 includes a linear adaptive filter 7. This filter performs a linear filtering on the distant signal and supplies its output to the subtractor 4, while its filter coefficients are constantly updated through a feedback loop according to the output of subtractor 4. The updating algorithm of linear adaptive filter 7 is a process of correlation calculation such that the residual echo at the output of subtractor 4 is reduced to a minimum. As a result, those components of the microphone signal which are correlated with the distant signal are minimized. A multiplier 8 is provided in the feedback loop to prevent near-end speech activity from disturbing the filter coefficients. When the near-end speech activity is high, the output of speech detector 5 is zero or near-zero, which nullifies the multiplier 8 so that the filter coefficients are frozen.

Nonlinearity is of another concern to the design of the echo canceller. The prior art echo cancellation may be satisfactory in so far as the nonlinearity of the acoustic echo path is of small magnitude and the linear echo canceller is able to replicate it. However, in practical systems the operating characteristics of transducer elements of the loudspeaker are far from ideal. Their nonlinear characteristics are of such a magnitude that the linear echo canceller cannot completely replicate the transfer function of nonlinear acoustic echo path. This is particularly true to cellular phones or notebook computers where their small-sized loudspeakers are operated in a high-powered hands-free mode. Due to their severe nonlinear characteristics, acoustic echo cannot be suppressed by more than 20 dB. The remaining echo component would propagate through the network and seriously impede the distant talker.

SUMMARY OF THE INVENTION

It is therefore an object of the present invention to provide echo suppression when the acoustic echo path of a full-duplex speech communication system suffers severe nonlinear distortion resulting from nonlinear operating characteristics of a loudspeaker.

According to a first aspect of the present invention, there is provided a speech communication apparatus comprising a signal output transducer for receiving a distant signal from a far-end talker and producing acoustic energy of the distant signal, a signal input transducer for producing a near-end signal which may contain a component representing a speech activity of a near-end talker or an acoustic echo component, or both, wherein the acoustic echo component occurs as a result of the distant signal being transmitted through an acoustic echo path from the signal output transducer to the signal input transducer, an echo canceller for producing an echo replica from the distant signal and a residual echo, and a residual echo detector for detecting a difference between the near-end signal and the echo replica and supplying the difference as the residual echo to the echo canceller. A spectral shaper is provided for receiving one of the near-end signal and the residual echo as a first input signal, receiving the echo replica as a second input signal, estimating from the first and second input signals the acoustic echo component when the speech activity is low or zero, and shaping the spectrum of the first input signal with the estimated acoustic echo component.

According to a second aspect of the present invention, there is provided a speech communication apparatus comprising a signal output transducer for receiving a distant signal from a far-end talker and producing acoustic energy of the distant signal, means for dividing the distant signal into a first set of subband frequency component signals, a signal input transducer for producing a near-end signal which may contain a component representing a speech activity of a near-end talker or an acoustic echo component, or both, wherein the acoustic echo component occurs as a result of the distant signal being transmitted through an acoustic echo path from the signal output transducer to the signal input transducer, means for dividing the near-end signal into a second set of subband frequency component signals, and a plurality of subband echo suppressors. Each subband echo suppressor comprises an echo canceller for producing an echo replica from a corresponding one of the first set of subband frequency component signals and a subband residual echo, a residual echo detector for detecting a difference between a corresponding one of the second set of subband frequency component signals and the echo replica and supplying the difference as the residual echo to the echo canceller, and subband spectral shaping means for receiving the residual echo as a first subband input signal receiving the echo replica as a second subband input signal estimating from the first and second input signals the acoustic echo component when the speech activity is low or zero, and shaping the first subband input signal with the estimated acoustic echo component to produce an output signal of the subband echo suppressor. The output signals of the plurality of subband echo suppressors are combined together to produce a local signal for transmission to the far-end talker.

BRIEF DESCRIPTION OF THE DRAWINGS

The present invention will be described in detail further with reference to the following drawings, in which.

DETAILED DESCRIPTION

Figure 1:
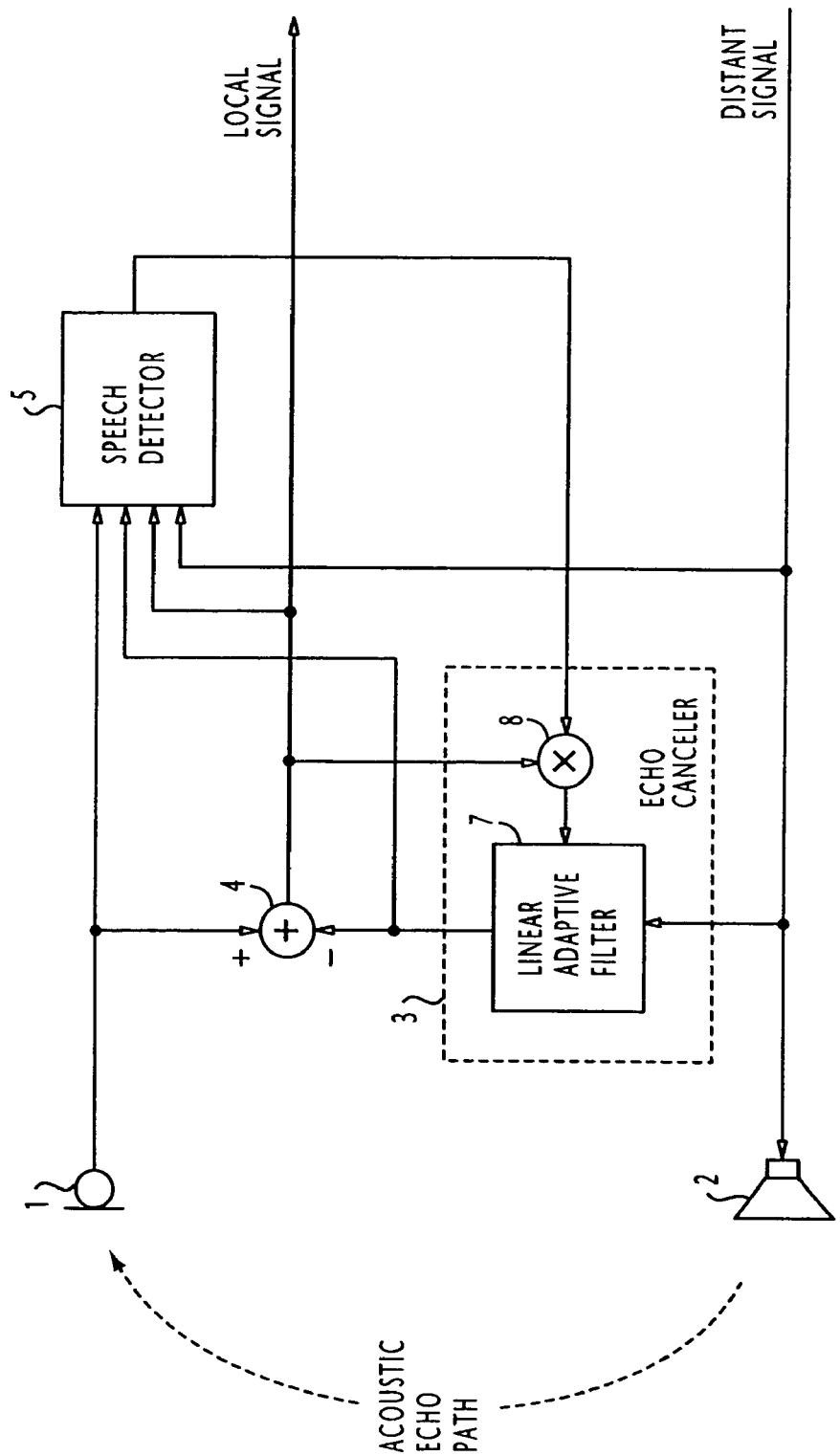
FIG. 1 is a block diagram of a prior art echo suppressor.
Figure 2:
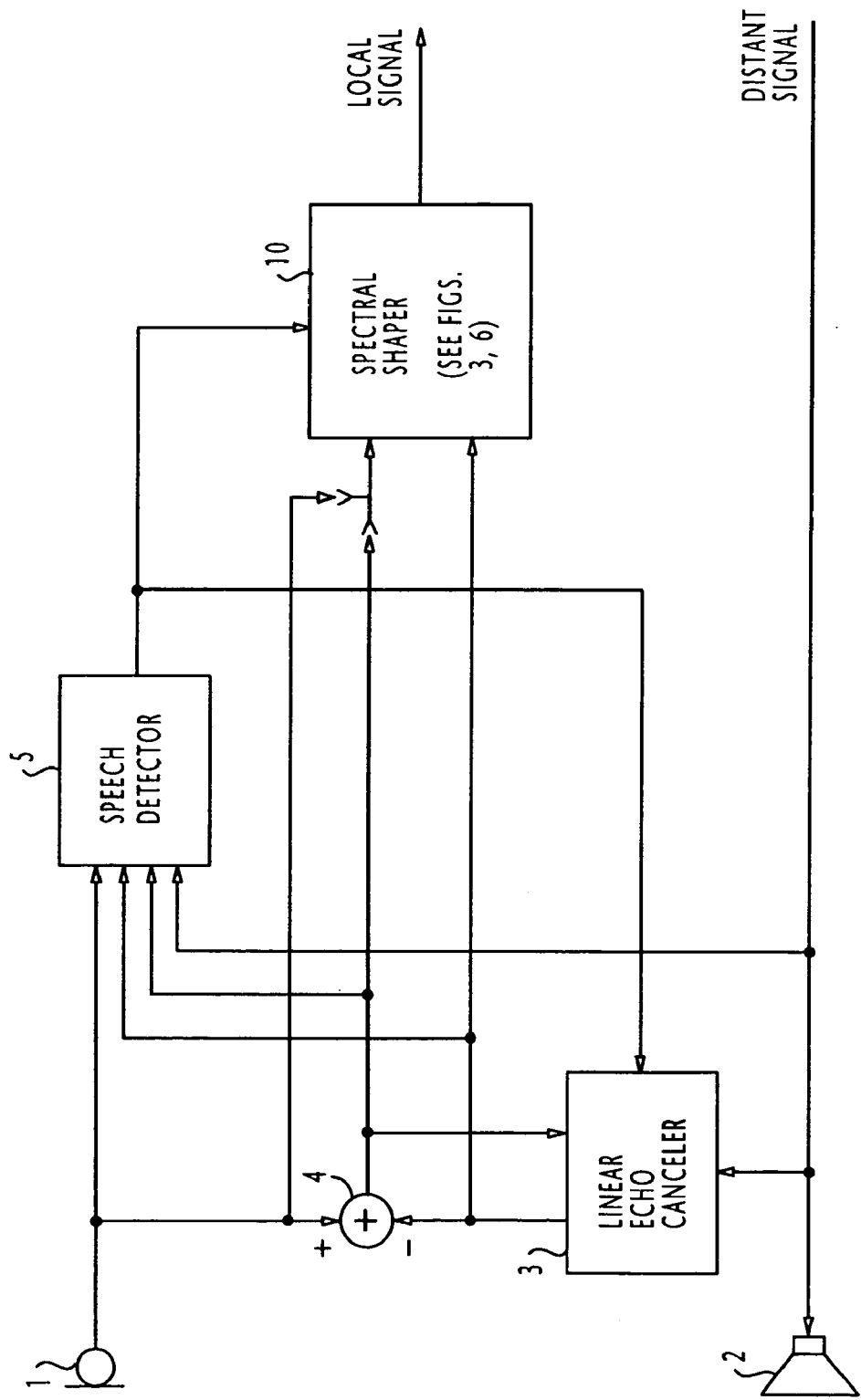
FIG. 2 is a block diagram of an echo suppressor according to a first embodiment of the present invention.

Referring now to FIG. 2, there is shown a hands-free speech communication system, or echo suppressor according to the present invention in which parts corresponding in significance to those in FIG. 1 are marked with the same numerals and the description thereof is omitted for simplicity. The echo suppressor may be coupled to a two-wire subscriber line using a well-known technique such as time compression multiplexing (TCM) or hybrid coupling (two-wire four-wire conversion). The echo suppressor includes a spectral shaper 10, which is configured to receive a first input signal either from subtractor 4 or microphone 1 and a second input signal from linear echo canceller 3. Spectral shaper 10 further receives the output of speech detector 5 as a disabling signal to nullify its operation when near-end speech activity is high.

If the output of subtractor 4 is used as an input to the spectral shaper, the echo cancellation is performed primarily in the subtractor 4. If the output of microphone 1 is used instead, the spectral shaper 10 takes the responsibility for the cancellation of acoustic echoes. For the purpose of disclosure, the spectral shaper uses the output of subtractor 4 as its first input signal.

Figure 3:
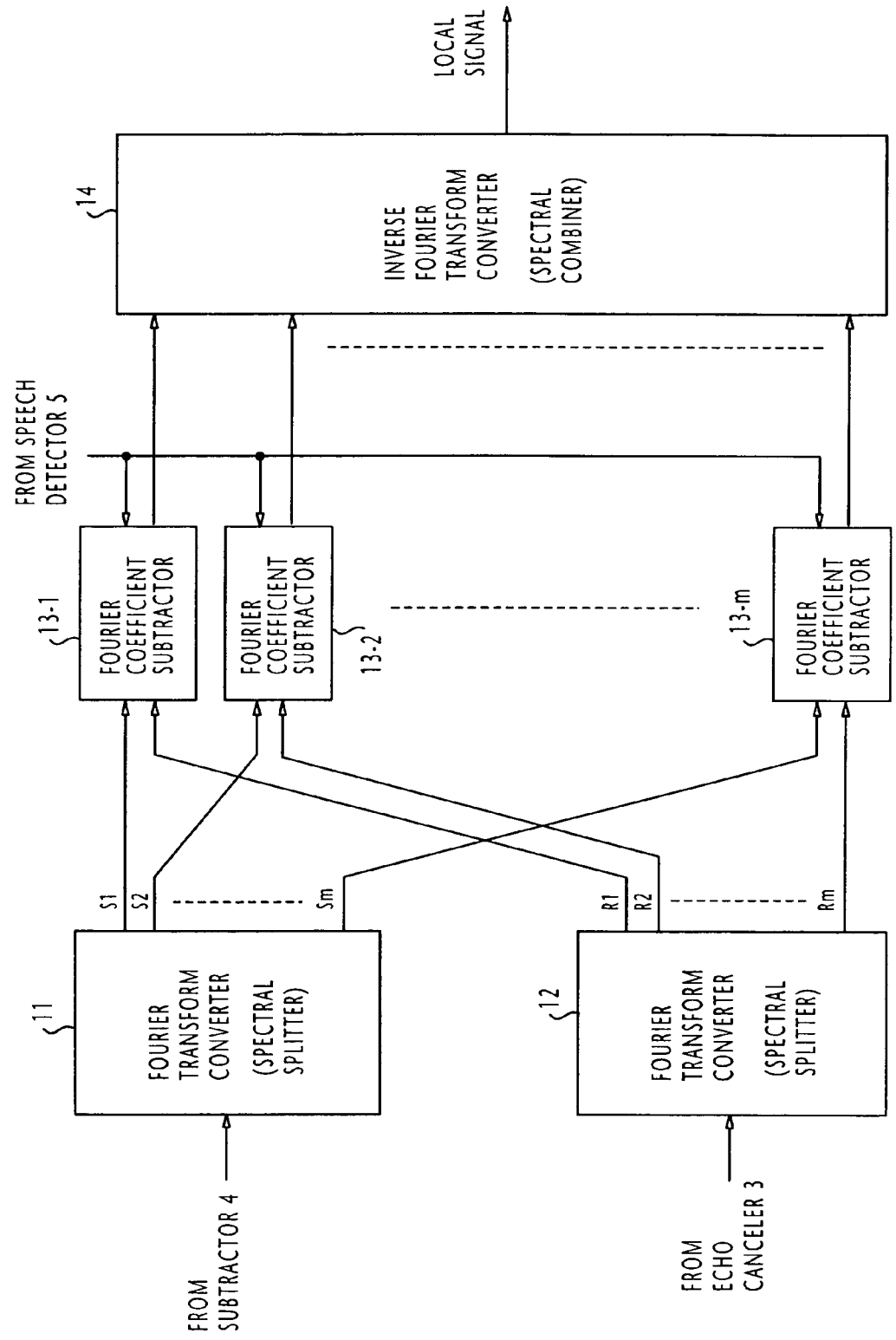
FIG. 3 is a block diagram of the spectral shaper of FIG. 2 implemented in a spectral subtractor according to a first embodiment of the present invention.

According to a first embodiment of the present invention, the spectral shaper 10 is implemented in a spectral subtractor as shown in FIG. 3. In the spectral subtractor 10, the first input signal is divided into a first set of subband frequency components and the second input signal is likewise divided into a second set of subband frequency components. From both sets of subband frequency components, nonlinear subband echo components are estimated to produce a set of echo cancellation signals respectively corresponding to the subband frequencies. Nonlinear echo components respectively contained in the first set of subband frequency components are cancelled by the corresponding subband echo cancellation signals and then combined together into a local signal for transmission.

In FIG. 3, the spectral shaper is configured as a spectral subtractor which includes Fourier transform converters (or spectral splitters) 11 and 12. Fourier transform converter 11 performs M-point Fourier transform calculations on its input signal from the subtractor 4 on a sample-by-sample basis to produce a first set of Fourier coefficients as the results of the calculations. As a result, the spectrum of the output signal of subtractor 4 is split into transform-domain subband frequency components S1, S2, . . . , Sm corresponding to the Fourier coefficients of the first set. In like manner, Fourier transform converter 12 performs M-point Fourier transform calculations on its input signal from the echo canceller 3. The results of the calculations are produced as a second set of Fourier coefficients corresponding to subband frequency components R1, R2, . . . , Rm.

A plurality of Fourier coefficient subtractors 13-1 through 13-$m$ are provided. Each Fourier coefficient subtractor 13-$i$ has a pair of input terminals for respectively receiving a subband component Si from the Fourier transform converter 11 and a subband component Ri from the Fourier transform converter 12.

The output of speech detector 5 is supplied to all Fourier coefficient subtractors 13 to control their time constant values (smoothing coefficients). As described in detail later, the estimate of each subband echo component is represented by an average value of the ratio of power or amplitude of its first input signal of each Fourier coefficient subtractor 13 to power or amplitude of its second input signal. Preferably, the time constant used to average these input signals is controlled such that it is smaller when the input signals are increasing than it is when they are decreasing. Alternatively, the averaging time constant value is long or infinite when speech activity is high and is short when speech activity is low. Additionally, when speech activity is low the averaging time constant value is smaller when the ratio is increasing than it is when the ratio is decreasing.

The output signals of all Fourier coefficient subtractors 13 are combined together in an inverse Fourier transform converter (spectral combiner) 14. Converter 14 performs an inverse Fourier transform calculation on each of its input signals and the real parts of the results of calculation are combined together to be delivered as a local signal.

Figure 4:
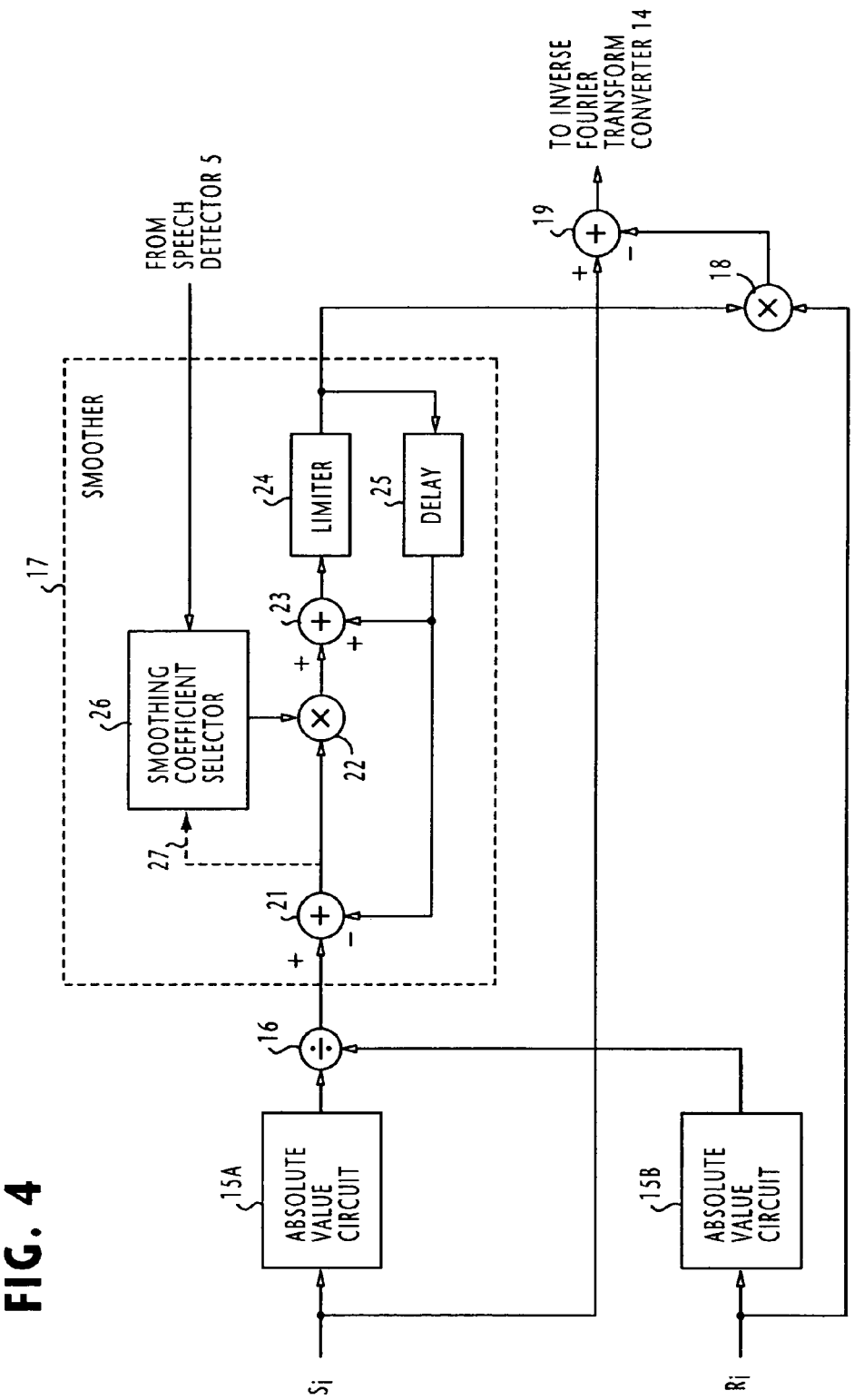
FIG. 4 is a block diagram of one form of the Fourier coefficient subtractors of FIG. 3.

Details of each Fourier coefficient subtractor 13$i$ are shown in FIG. 4. Fourier coefficient subtractor 13$i$ comprises absolute value circuits 15A and 15B. Absolute value circuits 15A and 15B receive the subband components Si and Ri from the Fourier transform converters 11 and 12 and produce absolute values of the Fourier coefficients Si and Ri respectively. A ratio of the absolute value Si to the absolute value Ri is obtained by a divider 16. The output of divider 16 is coupled to a smoother 17. The smoother 17 produces an average value of the Si/Ri ratio with a varying time constant depending on the level of speech activity detected by the speech detector 5. When near-end speech activity is high, the time constant is set to a large or infinite value. When the speech activity is low or zero, the smoother 17 operates with a small time constant value. Smoother 17 has the effect of stabilizing the Fourier coefficient subtractor 13 when the ratio varies violently in response to a high near-end speech signal so that a reliable output signal is obtained.

More specifically, the smoother 17 may be implemented in a leaky integrator or a first-order IIR (infinite impulse response) lowpass filter. If the smoother is implemented in a leaky integrator, it is comprised of a subtractor 21, a multiplier 22, an adder 23, a limiter 24, and a one-sample delay element 25, all of which are connected in a closed loop by coupling the output of the delay 25 to the subtractor 21 and adder 23. The ratio output of divider 16 is supplied to the subtractor 21 where the output of delay 25 is subtracted from the Si/Ri ratio. The output of subtractor 21 is supplied to the multiplier 22, where the ratio is scaled in accordance with a scale factor supplied from a smoothing coefficient (time constant) selector 26. Selector 26 responds to the output of speech detector 5 by setting the scale factor to a very small non-negative coefficient "0.0", for example, when speech activity is low or zero so that the smoothing time constant remains unchanged. When speech activity is high, the selector 26 sets the scale factor to a relatively high positive coefficient "0.005". The output of multiplier 22 is summed with the output of delay 25 to produce a sum signal. After limiting its amplitude to within upper and lower bounds by the limiter 24, the sum signal is fed to the delay 25, so that the scaled ratio is integrated over time and averaged out when the near-end talker is in a talking mode.

Preferably, the smoothing coefficient selector 26 is modified so that it responds to the output of subtractor 21, as indicated by a broken line 27, in addition to the output of speech detector 5. When the near-end speech activity is high the selector 26 supplies a non-negative coefficient of 0.0, for example. When the near-end speech activity is low or zero, the selector 26 supplies a relatively large smoothing coefficient of 0.01, for example, if the output of subtractor 21 is positive (indicating that it is producing an increasing output) and a relatively small coefficient of 0.001 if the subtractor 21 is producing a negative output (indicating that the output is decreasing). With these time-varying smoothing scale factors, the output of the smoother 17 varies sharply at the rising edge of a transition and varies slowly at the falling edge of the transition. With this arrangement, the output of the smoother 17 is made to follow the sharply rising and gradually falling edges of natural sounds. Acoustic echo can be estimated with a higher degree of accuracy.

The ratio averaged by smoother 17 is withdrawn from the output of limiter 24 and multiplied in a multiplier 18 by the signal Ri.

Since the Si/Ri ratio obtained by the divider 16 can be considered as a quotient of the Fourier coefficient of a near-end subband component divided by the Fourier coefficient of a far-end subband component, multiplying the ratio by the Fourier coefficient of subband component Ri of the echo replica in the multiplier 18 results in a value which is equal to the Fourier coefficient of the subband component "i" of the near-end signal and represents an estimate of the Fourier coefficient of the residual subband component in the echo replica. The estimated residual subband component of the echo replica obtained by the multiplier 18 is supplied to a subtractor 19 to cancel the acoustic subband echo component contained in the near-end speech signal Si.

It is seen that the spectral subtractor 10 performs nonlinear calculations in the frequency domain. In this respect, the timing variations of subband components are of important consideration. Nonlinear distortion of the echo channel in the acoustic path is effectively compensated for by adaptively adjusting the timings of the subband signals. In the time domain, the linear echo canceller 3 performs this operation in a manner complementarily to the operation of spectral subtractor 10.

In quantitative terms, the operation of the spectral subtractor, particularly, the Fourier coefficient subtractors 13 is analyzed as follows:

If the Fourier coefficient of the near-end signal is denoted as S, the following relation holds:

$$S = A + E + N \qquad (1)$$

where, A is the near-end talker's speech component E is an echo component and N is a noise component. The Fourier coefficient of the far-end signal (R) is in phase with the Fourier coefficient S of the near-end signal. If A is not present, i.e., there is no near-end speech activity, the near-end signal S is E+N, which can be completely discarded. Under such conditions, the following relation holds:

$$P1 = Av[S/R] = Av[(E+N)/R] \qquad (2)$$

where, P1 is the output of the smoother 17 and Av [•] represents a smoothing operator. P1 approximates the proportion of the distant signal R that contributes to the echo and can be treated as the "echo gain" of an acoustic echo path.

If the output of multiplier 18 is denoted as P2, the following relation is established:

$$\begin{aligned} P2 &= P1 \times R \qquad &(3) \\ &= R \times Av[(E+N)/R] \\ &= Ex[E+N] \end{aligned}$$

where, Ex [•] represents an estimate,

The output signal P3 of subtractor 19 is given as follows:

$$\begin{aligned} P3 &= S - P2 \\ &= S - (R \times Av[(E+N)/R]) & (4a) \\ &= (A+E+N) - Ex[E+N]) & (4b) \\ &= Ex[A] & (4c) \end{aligned}$$

Equation (4c) implies that an estimate of a noiseless, echo-free speech component A can be obtained for the near-end Fourier coefficient S.

In addition, the nonlinear echo component of a distant signal contained in the output signal of microphone 1 can be treated as harmonics of the distant signal. Consider an echo component E by assuming that it exclusively contains harmonics. Equations (2) and (3) show that, in principle, the echo component E can be completely removed in so far as the distant Fourier transform component R is non-zero. However, for cancelling the echo component E, the accuracy of the echo gain P1 that can be attained is also important. Since the amount of harmonics varies significantly from instant to instant depending on the characteristics of the distant signal such as amplitude, it is desirable that the timing variation of the distant Fourier transform component R be as synchronized as possible to the timing variation of the echo component E, as indicated by the denominator and nominator of Equation (2). High degree of accuracy can be obtained for the echo gain P1 if the timing variations of these components occur in synchronism to each other. It is an advantageous feature of the present invention that, since the spectral subtractor derives the Fourier transform component R from the output of linear echo canceller 3, the timing variations of components E and R are substantially synchronized to each other.

Another feature of the present invention resides in the fact that even if the linear echo canceller 3 makes an error in the echo path estimation, resulting in a residual echo at the output of subtractor 4 the spectral subtractor of this invention can remove such a residual echo. In this regard, the above discussion also applies to the type of echo components E that contain non-harmonics of the distant signal.

A further feature of the present invention is that the use of the spectral subtractor in combination with the linear echo canceller 3 enables its adaptive filter 7 to operate with a reduced number of delay-line taps. Hence, the amount of computations can be decreased. In the prior art where the linear echo canceller is used exclusively, a reduction of the delay-line taps inevitably results in a significant decrease in the amount of echo that can be cancelled.

Figures 5A, 5B:
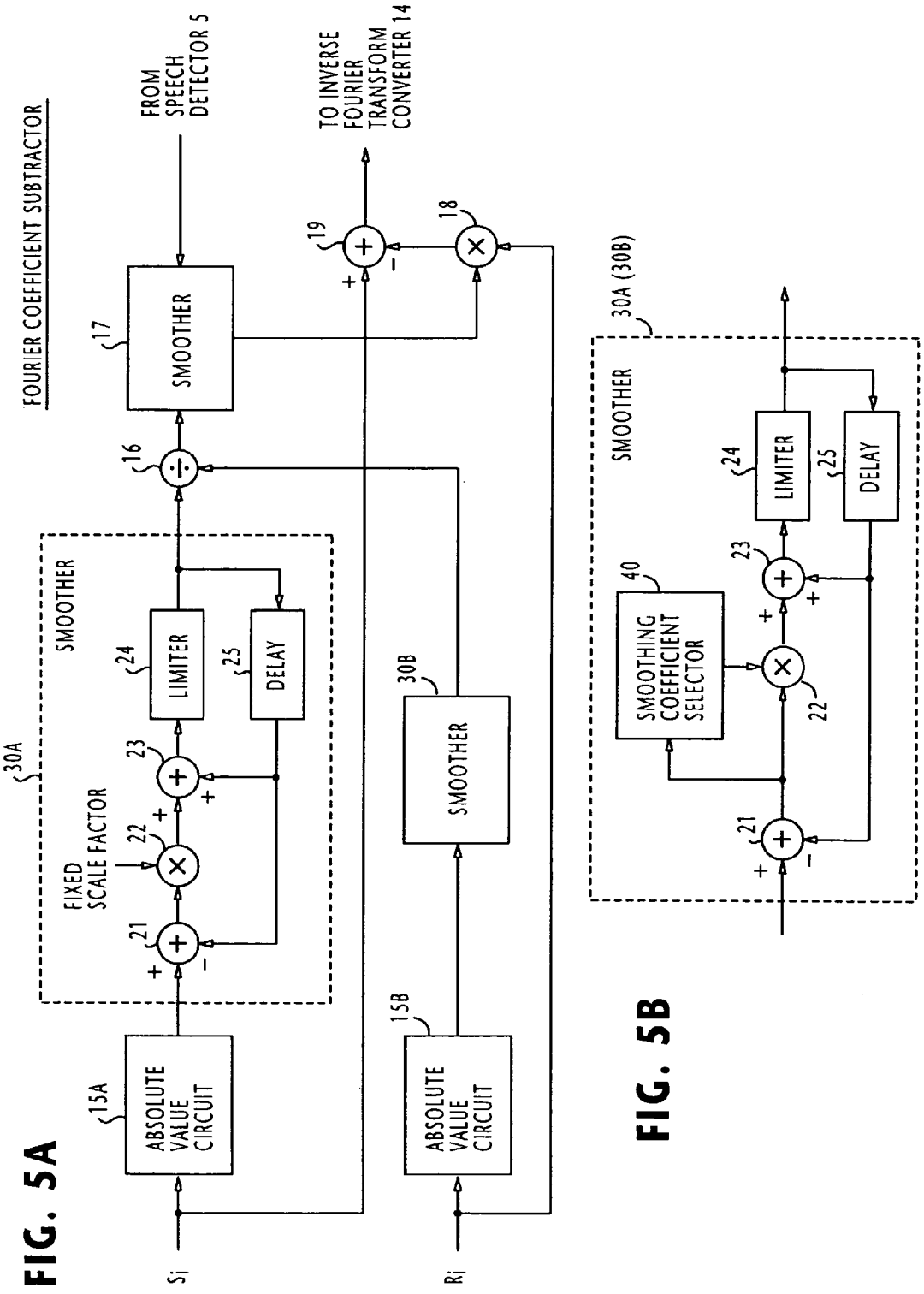
FIGS. 5A and 5B are block diagrams of modified forms of the Fourier coefficient subtractors.

A modification of the Fourier coefficient subtractors is shown in FIG. 5A. In this modification, the Fourier coefficient subtractor additionally includes smoothers 30A and 30B of identical configuration connected between the absolute value circuits 15A, 15B and the divider 16. As a representative, the smoother 30A is shown in detail. It is seen that the smoothers 30A, 30B are identical to the smoother 17 except that their multiplier 22 is supplied with a fixed smoothing constant. The effect of the smoothers 30A and 30B is to smooth out the rapidly varying outputs of the absolute value circuits 15A, 15B, so that the smoother 17 produces a quotient of more stabilized value than that of FIG. 4.

In a preferred embodiment shown in FIG. 5B, each of the smoothers 30A, 30B includes a smoothing coefficient selector 40 which adaptively controls the scale factor of the multiplier 22 in response to the output of subtractor 21 in a manner similar to the selector 26 of FIG. 4. As described previously, when the output of subtractor 21 is positive, the selector 40 produces a relatively large smoothing coefficient of 0.01. When the subtractor 21 produces a negative output, the selector 40 supplies a relatively small smoothing coefficient of 0.001 to the multiplier 22. With these time-varying smoothing scale factors, the output of each smoother 30 varies sharply at the rising edge of a transition and varies slowly at the falling edge of the transition. It is known that, in most instances, the amplitude variation, or envelope of human voices and music sounds has a sharply rising edge and a gradually falling edge. Smoothers 30A, 30B of FIG. 5B are best suited for such applications. The operating performance of the Fourier coefficient subtractor of FIG. 5A is further improved with the use of smoothing coefficient selector 40 of FIG. 5B.

Figure 6:
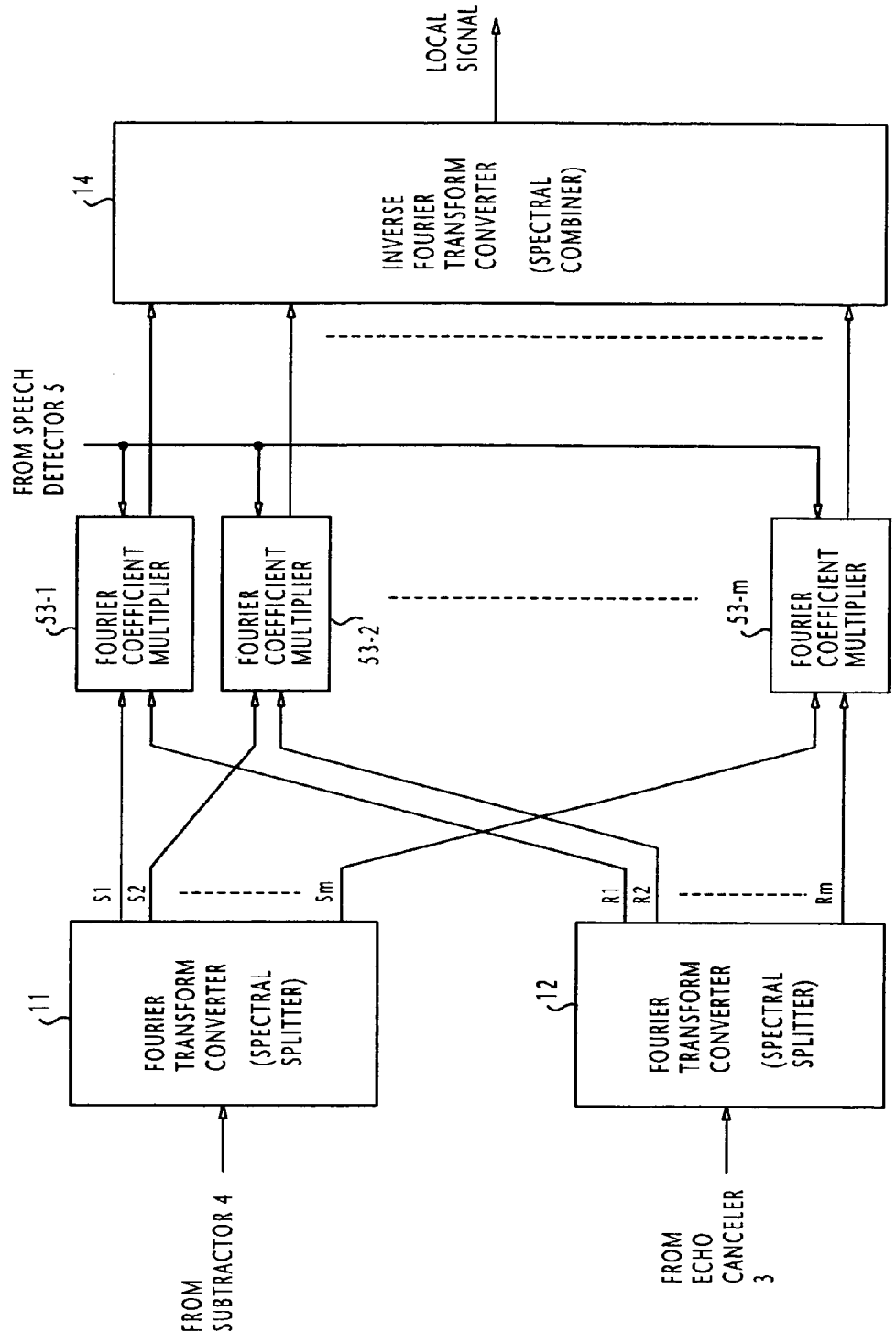
FIG. 6 is a block diagram of a second embodiment of the spectral shaper of FIG. 2 implemented in a spectral suppressor.

According to a second embodiment, the spectral shaper 10 is implemented in a spectral suppressor as shown in FIG. 6, in which parts corresponding in significance to those in FIG. 3 are marked with the same numerals and the description thereof is omitted. It will be seen that the spectral suppressor differs from the spectral subtractor of FIG. 3 in that the Fourier coefficient subtractors 13-1~13-m of FIG. 3 are replaced with Fourier coefficient multipliers 53-1~53m.

Figure 7:
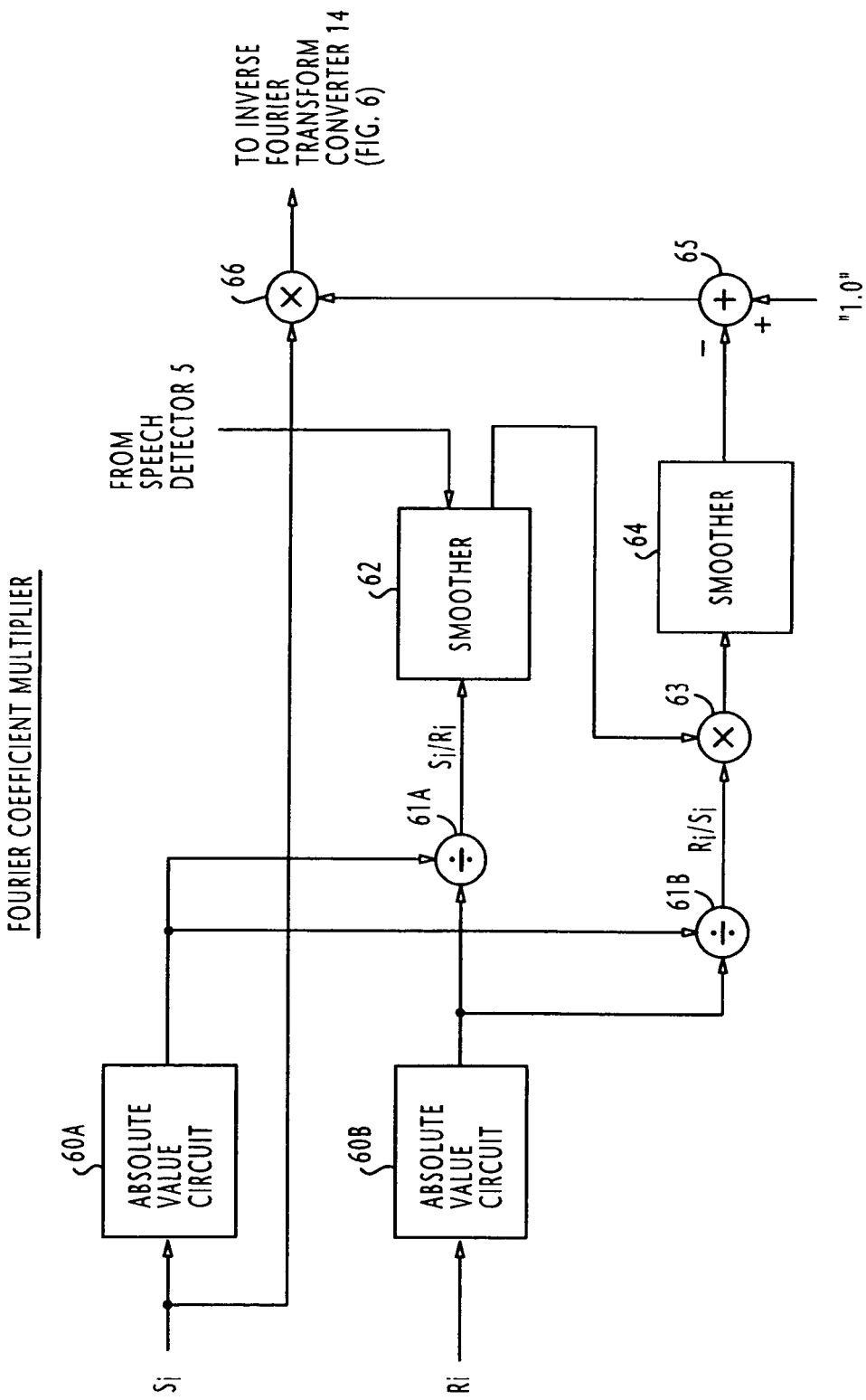
FIG. 7 is a block diagram of one form of the Fourier coefficient multipliers of FIG. 6.
Figure 10:
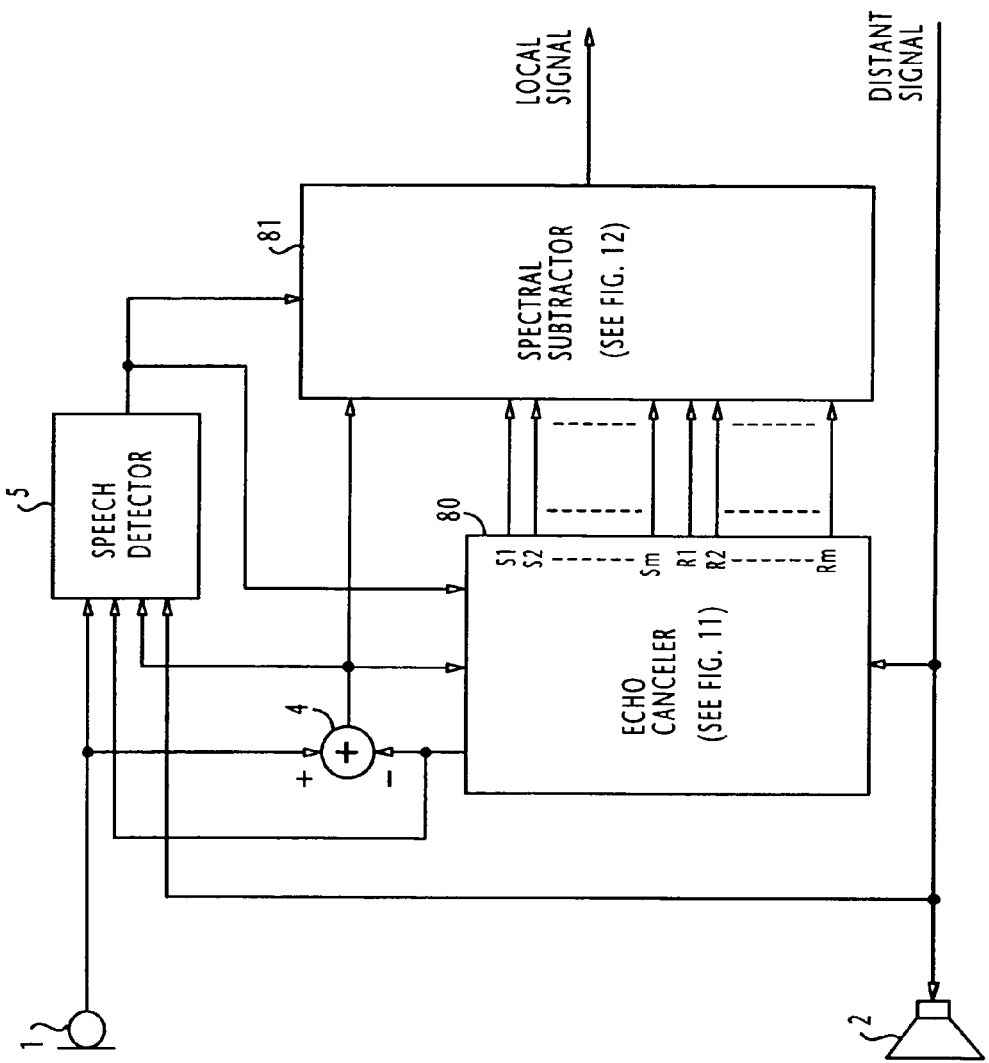
FIG. 10 is a block diagram of an echo suppressor according to a further modification of the present invention.

As shown in detail in FIG. 10, each of the Fourier coefficient multipliers 53 is comprised of absolute value circuits 60A and 60B, which receive the subband components Si and Ri from the Fourier transform converters 11 and 12 and produce absolute values of the Fourier coefficients Si and Ri, respectively. A ratio of the absolute value Si to the absolute value Ri is obtained by divider 61A and a ratio of the absolute value Ri to the absolute value Si is obtained by divider 61B. The output of divider 61A is coupled to a smoother 62 which is identical to the smoother 17 of FIG. 4. The smoother 62 produces an average value of Si/Ri ratios with a varying time constant depending on the level of speech activity detected by the speech detector 5. When near-end speech activity is high, the time constant is set to a large or infinite value. When the speech activity is low or zero, the smoother 62 operates with a small time constant value. Smoother 62 has the effect of stabilizing the Fourier coefficient multiplier 53 when the ratio varies violently in response to a high near-end speech signal so that a reliable output signal is obtained. The output of smoother 62 is coupled to a multiplier 63 to which the output of divider 61B is also applied. The ratio Ri/Si of divider 61B is multiplied by the smoothed value of ratios Si/Ri from smoother 62 in the multiplier 63 and then smoothed by a smoother 64 of the fixed time-constant type identical to those shown in FIGS. 5A, 5B. The output of smoother 64 is fed to a subtractor 65 which subtracts a constant value of "1.0" from the input signal. By comparing the Fourier coefficient multiplier of FIG. 7 with the Fourier coefficient subtractor of FIG. 4, it will be seen that the output signal P4 of subtractor 65 is equal to the output signal P3 of subtractor 19, as given by Equation (4a), divided by the near-end signal S and averaged. P4 is represented by:

$$P4 = Av[P3/S] \quad (5)$$
$$= Av[1 - \{(R/S) \times Av[(E+N)/R]\}]$$
$$= 1 - Av[\{(R/S) \times Av[(E+N)/R]\}]$$

Further, the output signal P4 can be obtained by dividing Equation (4b) by S and averaging the result of the division as follows:

$$P4 = Av[\{(A+E+N) - Ex[E+N]\}/S] \quad (6)$$
$$= Av[Ex[A]/S]$$
$$= Ex[A/S]$$

By comparing Equation (5) to Equation (6), it will be seen that the output signal P4 of subtractor 65 represents an estimate of the amount of near-end talker's speech component contained in a local signal.

The input signal Si is then multiplied in a multiplier 66 by the output of subtractor 65 to produce an output signal for application to the inverse Fourier transform converter 14 of FIG. 6. The output signal of this Fourier coefficient multiplier 53i represents an estimate of the Fourier coefficient of echo-suppressed near-end subband speech component.

Since the signal P3 of the previous embodiment represents an estimate of the Fourier coefficient of near-end speech component containing no disturbing components including linear echo, noise, and harmonic echo (resulting from the nonlinear characteristics of transducer elements), the signal P4 is also free from the harmonic echo. Therefore, the multiplication of a subband input signal Si by P4 results in the elimination of its harmonic echo component. Similar to the previous embodiment, the spectral suppressor can remove a residual echo resulting from the echo canceller 3 making a false echo path estimation.

Figure 8:
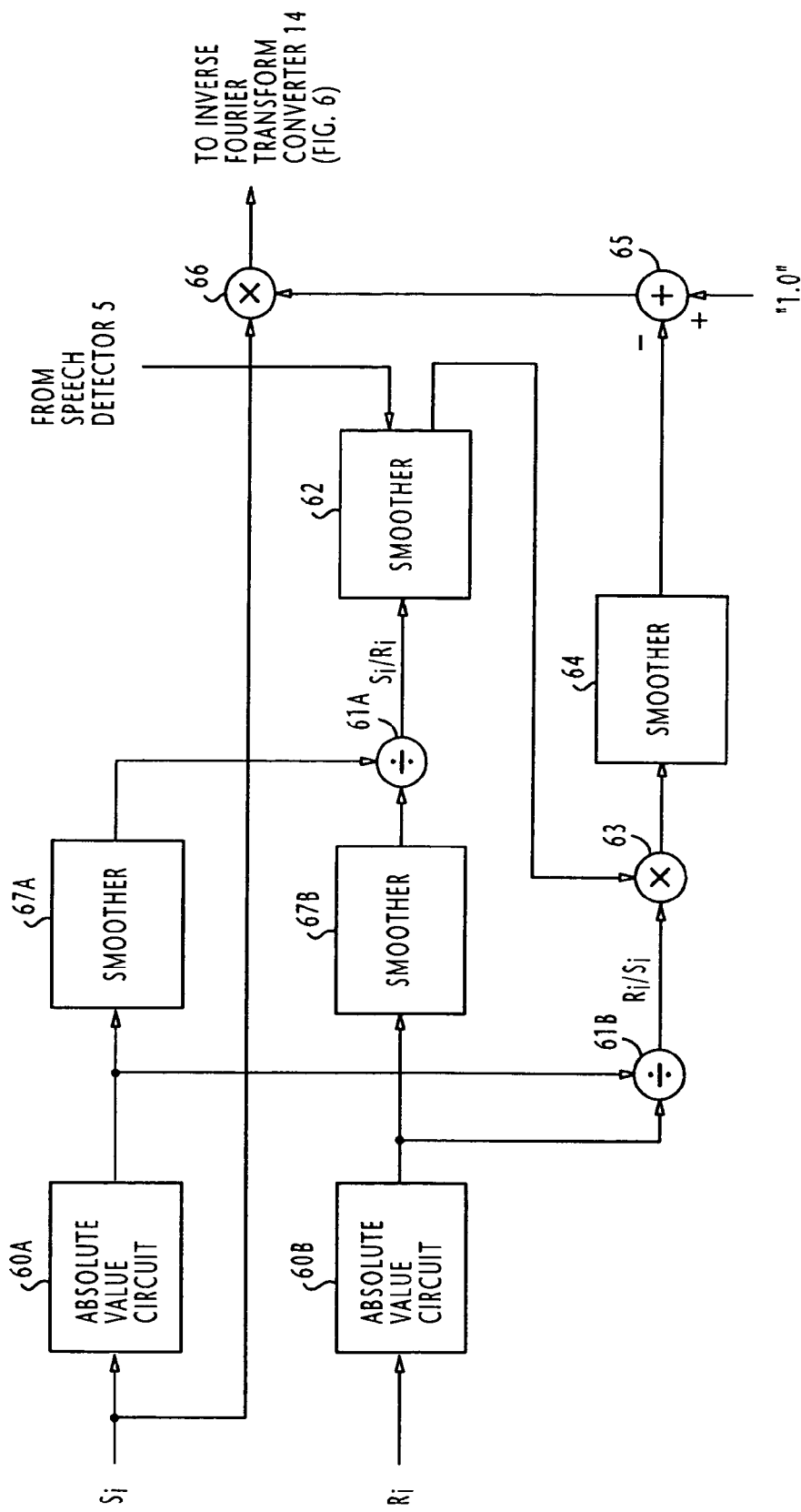
FIG. 8 is a block diagram of a modified form of the Fourier coefficient multipliers.

As illustrated in FIG. 8, each Fourier coefficient multiplier 53 is preferably provided with smoothers 67A and 67B between the absolute value circuits 60A, 60B and the dividers 61A, 61B. The effect of the smoothers 67A and 67B is to smooth out the rapidly varying outputs of the absolute value circuits 60A, 60B, so that the smoother 62 produces a quotient of more stabilized value than that of FIG. 7.

Figure 9:
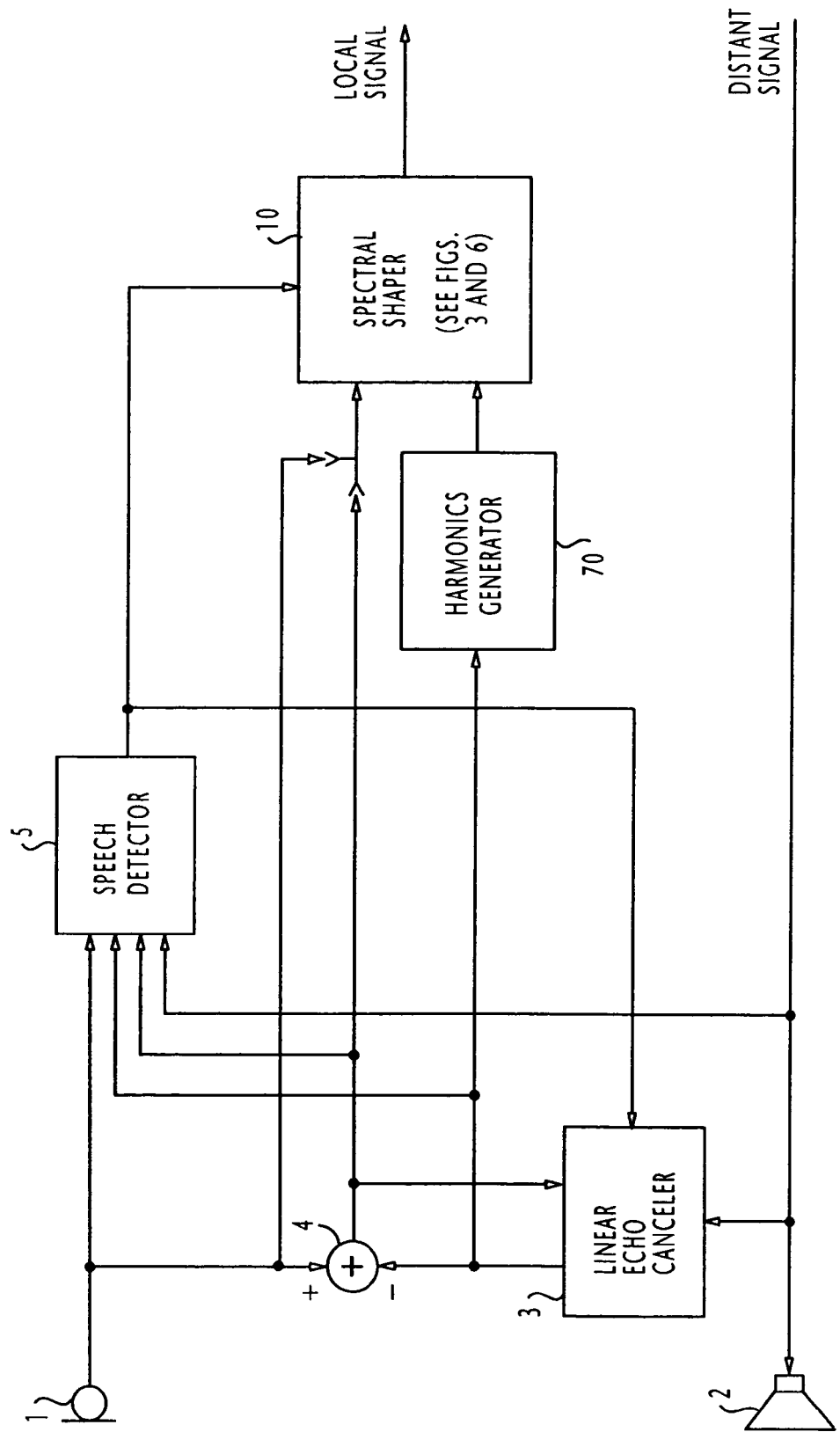
FIG. 9 is a block diagram of an echo suppressor according to a modified embodiment of the present invention.

FIG. 9 illustrates a modification of the previous embodiments. In this modification, a harmonics generator 70 is provided between the output of linear echo canceller 3 and the spectral shaper 10. Harmonics generator 70 emphasizes the harmonic components of an echo replica generated by the echo canceller 3 so that the echo replica supplied to the spectral shaper 10 contains a harmonics replica of the distant signal. This harmonics replica is similar to the nonlinear distortion of the acoustic echo path. The provision of the harmonics generator 70 enables the spectral shaper 10 to perform its echo suppression in an efficient manner.

While the spectral shaper 10 has been described as operating on a sample-by-sample basis to perform its Fourier transformation, the amount of computations can be reduced by performing Fourier transform on a frame-by-frame basis using the overlap save and overlap add techniques as described in a paper "Frequency-Domain and Multirate Adaptive Filtering", John J. Shynk, IEEE signal Processing Magazine, January 1992, pages 1437.

Linear echo cancellers that perform echo cancellation in a linear transform domain and reconstitution in an inverse transform domain is called a transform-domain echo canceller. The amount of computations can be reduced by implementing the linear echo canceller 3 in a transform-domain echo canceller configuration and implementing the spectral shaper 10 in a transform domain configuration identical to that of the echo canceller.

An echo suppressor incorporating such a transform-domain echo canceller 80 and a transform-domain spectral shaper 81 is shown in FIG. 10. As illustrated, the echo canceller 80 generates and supplies a first set of transform-domain subband frequency components S1~Sm and a second set of transform-domain subband frequency components R1~Rm to the spectral subtractor 81.

Figure 11:
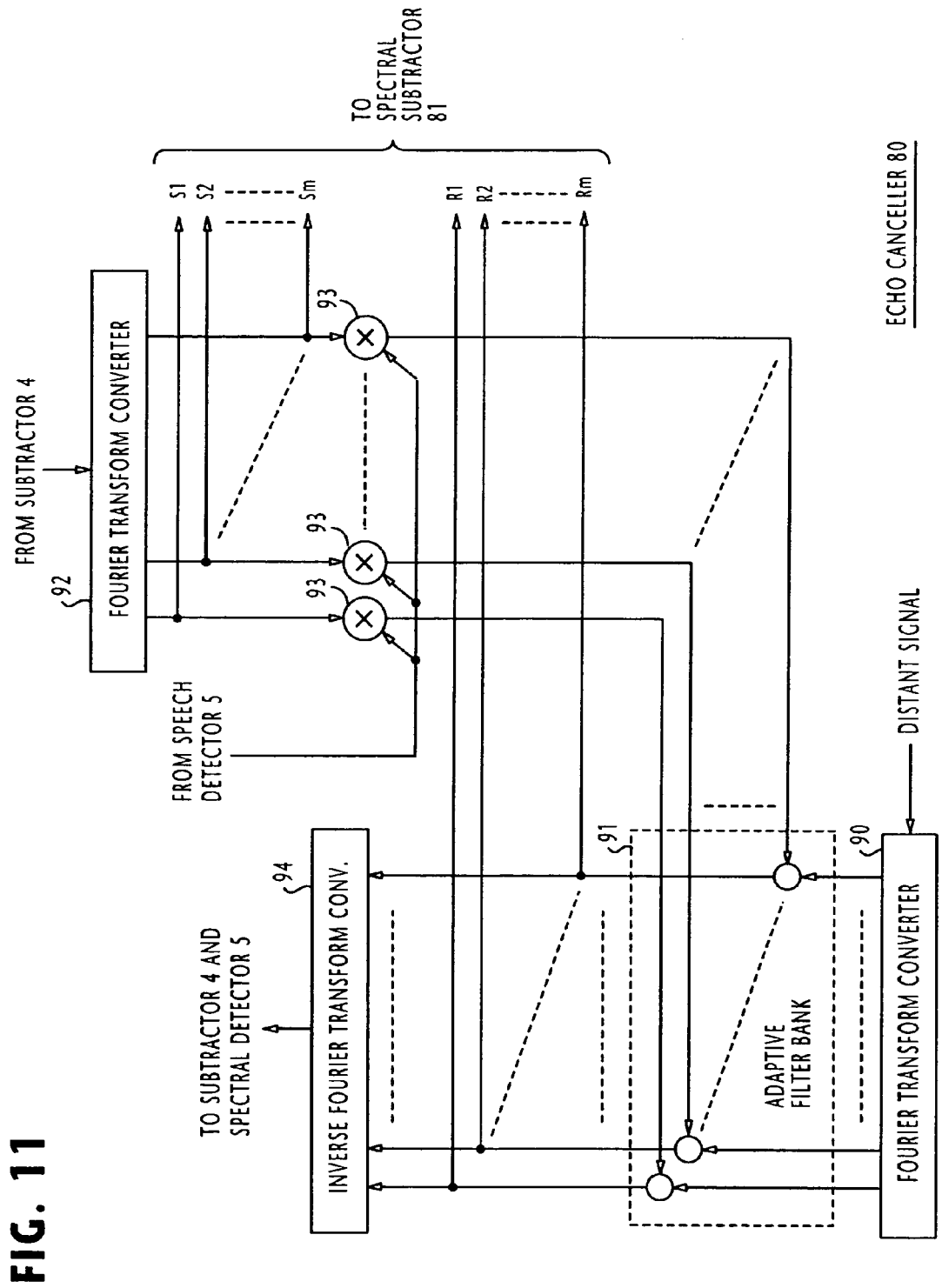
FIG. 11 is a block diagram of the echo canceller of FIG. 10.

As shown in detail in FIG. 11, the echo canceller 80 is comprised of a Fourier transform converter 90 in which the distant signal is converted to a set of transform-domain subband frequency components and supplied to corresponding adaptive filters of an adaptive filter bank 91. The output of subtractor 4 is also converted in a Fourier transform converter 92 to a set of transform-domain subband frequency components S1~Sm and supplied to corresponding multipliers 93, whose outputs are supplied to the adaptive filter bank 91. Adaptive filter bank 91 produces and supplies a set of transform-domain subband frequency components R1~Rm to an inverse Fourier transform converter 94 where the input signals are inversely processed and combined together into an output signal for coupling to the subtractor 4 as well as to the spectral detector 5.

Multipliers 93 are controlled by the speech detector 5 so that their outputs are forced to zero when the near-end speech activity is high.

To the spectral subtractor 81 a first set of transform-domain subband components S1-~Sm and a second set of transform-domain subband components R1~Rm are supplied from the Fourier transform converter 92 and the adaptive filter bank 91, respectively.

Figure 12:
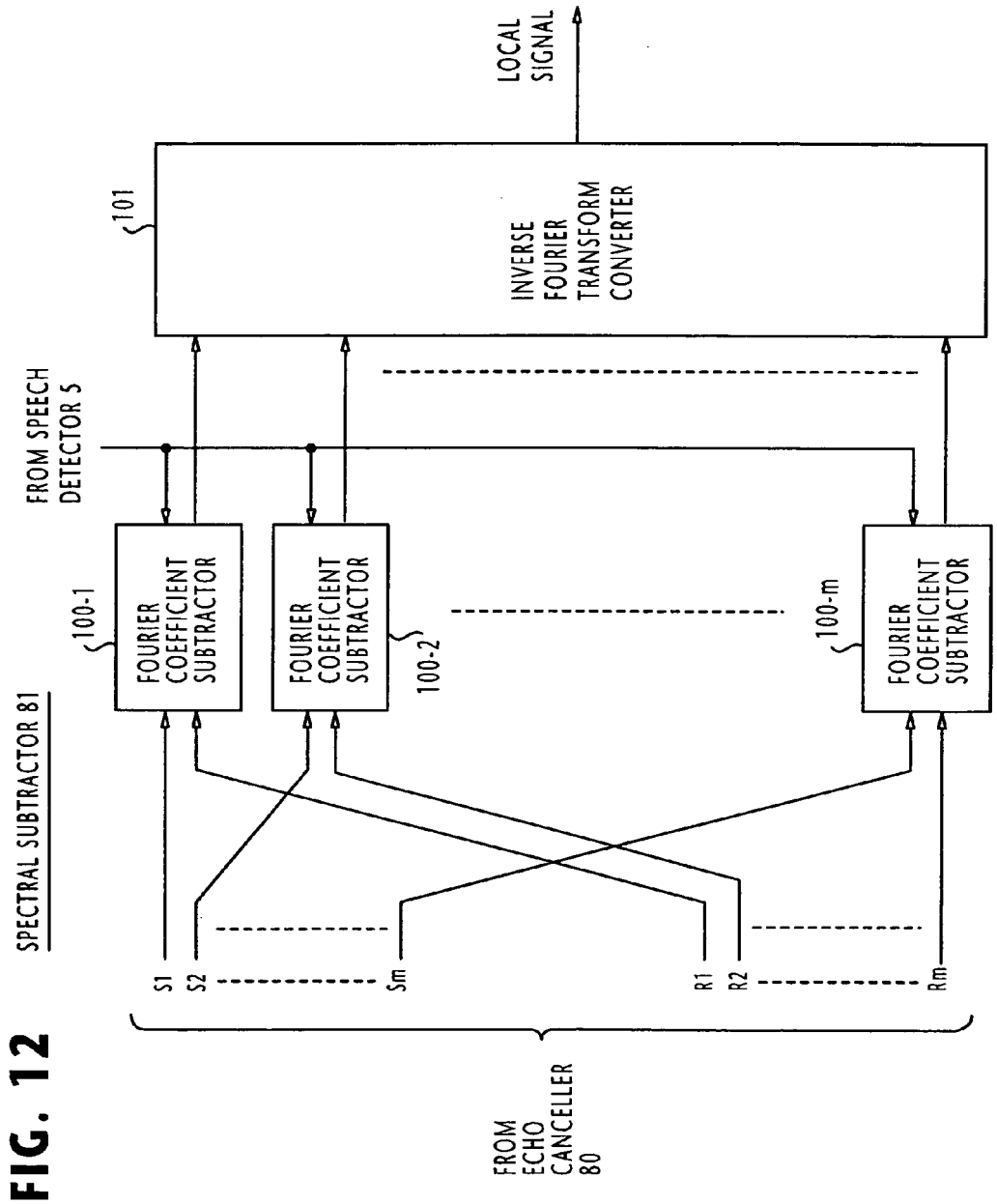
FIG. 12 is a block diagram of the spectral subtractor of FIG. 10.

Spectral subtractor 81 includes a plurality of Fourier coefficient subtractors 100-1~100-$m$, as shown in FIG. 12. Similar to that shown in FIG. 3, each Fourier coefficient subtractor 100-$i$ has a pair of input terminals for receiving and processing signals Si and Ri from the echo canceller 80 according to the output of the speech detector 5 and feeds its output to an inverse Fourier transform converter 101.

Figure 13:
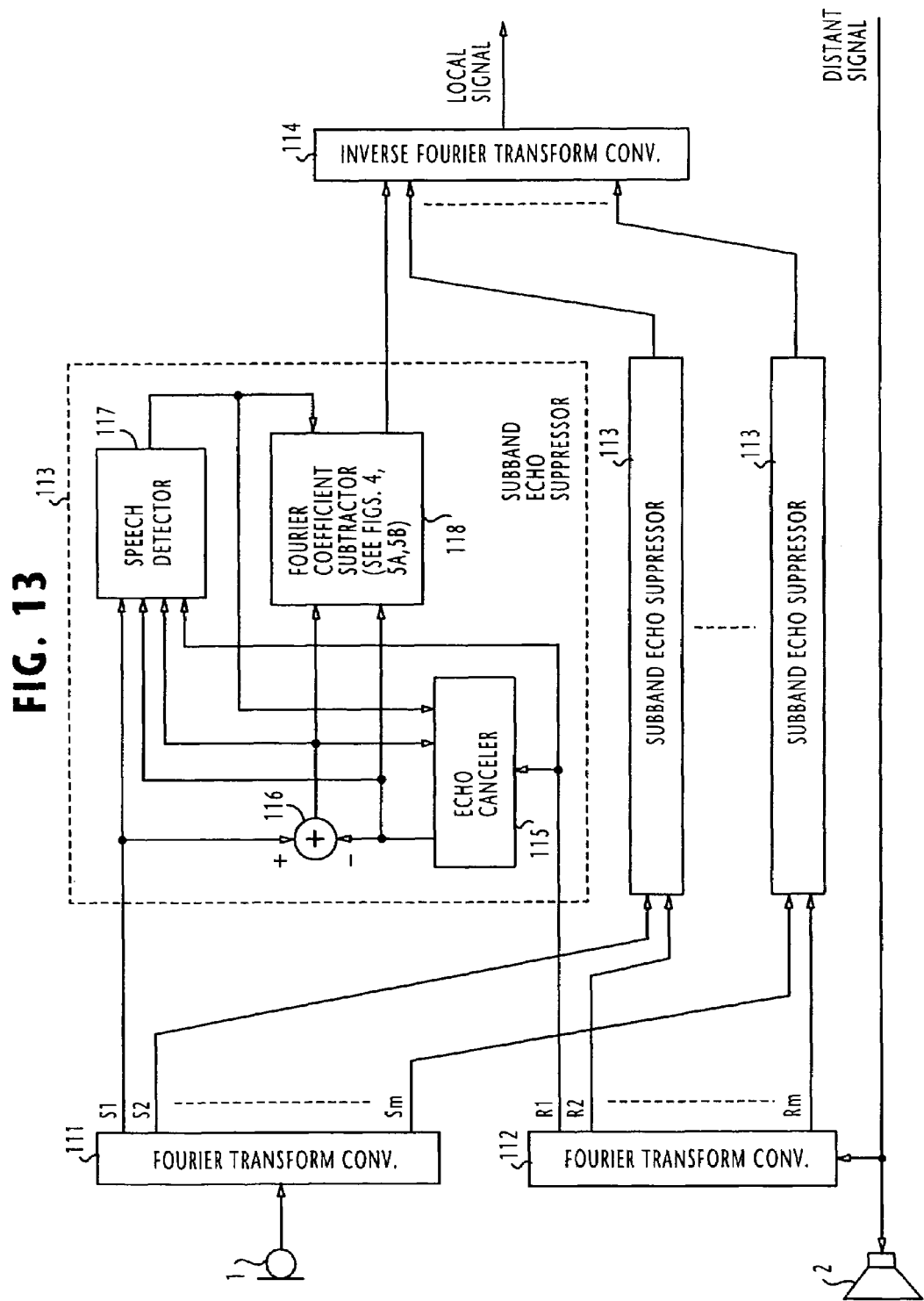
FIG. 13 is a block diagram of an echo suppressor according to a third embodiment of the present invention

A third embodiment of the present invention is shown in FIG. 13. In this embodiment, a Fourier transform converter 111 converts the output of microphone 1 into a first set of subband component signals S1~Sm and a Fourier transform converter 112 converts a copy of the distant signal supplied to the loudspeaker 2 into a second set of subband component signals R1~Rm. A plurality of subband echo suppressors 113 of identical structure are provided corresponding in number to the subband frequency component signals of each set. An inverse Fourier transform converter 114 is provided to combine the output signals of the subband echo suppressors 113 into a local signal.

Each subband echo suppressor 113 is basically of the same configuration as that described previously. It includes an echo canceller 115, a subtractor 116, a speech detector 117, but differs from the previous embodiments in that the spectral shaper 10 is replaced with a Fourier coefficient subtractor 118 of the type previously shown in FIGS. 4, 5A and 5B (or Fourier coefficient multiplier of FIGS. 7 and 8). Echo canceller 115 receives and processes a corresponding one of the outputs of Fourier transform converter 112 for feeding the subtractor 116. Subtractor 116 receives a corresponding one of the outputs of the Fourier transform converter 111 for feeding the Fourier coefficient subtractor 118.

While mention has been made of Fourier transform linear transform such as discrete cosine transform and filter-bank transform can equally be used as well.

What is claimed is:

1. A speech communication apparatus comprising:
   a signal output transducer for receiving a distant signal from a far-end talker and producing acoustic energy of the distant signal;
   a signal input transducer for producing a near-end signal which may contain a component representing a speech activity of a near-end talker or an acoustic echo component, or both, wherein said acoustic echo component occurs as a result of the distant signal being transmitted through an acoustic echo path from the signal output transducer to the signal input transducer;
   an echo canceller having a replica of a transfer function of said acoustic echo path for producing an echo replica from both of said distant signal and from a residual echo representing a difference between said near-end signal and said echo replica; and
   a spectral shaper for receiving one of said near-end signal and said residual echo as a first input signal, receiving said echo replica as a second input signal, estimating said acoustic echo component by modifying said second input signal, and shaping spectrum of said first input signal with the estimated acoustic echo component.

2. The speech communication apparatus of claim 1, wherein said spectral shaper estimates said acoustic echo component for each of a plurality of subband frequencies of audio spectrum.

3. The speech communication apparatus of claim 1, wherein said spectral shaper estimates said acoustic echo component from a ratio of said first input signal to said second input signal.

4. The speech communication apparatus of claim 1, wherein said spectral shaper estimates said acoustic echo component from a ratio of said first input signal to said second input signal for each of a plurality of subband frequencies of audio spectrum.

5. The speech communication apparatus of claim 1, wherein said spectral shaper comprises:
   means for dividing said first input signal into a first set of subband frequency component signals;
   means for dividing said second input signal into a second set of subband frequency component signals;
   a plurality of subband spectral shaping means, each of the subband spectral shaping means receiving a corresponding one of the first set of subband frequency component signals as a first subband signal, receiving a corresponding one of the second set of subband frequency component signals as a second subband signal, producing an estimate of a subband acoustic echo component from the first and second subband signals, and shaping the first subband signal with the estimate of the subband acoustic echo component; and means for combining output signals of said plurality of subband spectral shaping means.

6. The speech communication apparatus of claim 5, wherein each of said subband spectral shaping means comprises:
a division circuit for producing a ratio of said first subband signal to said second subband signal;
a smoother for smoothing said ratio when said speech activity is low or zero;
a multiplier for multiplying said second subband signal by said smoothed ratio to produce said estimate of the subband acoustic echo component; and
a subtractor for producing a difference signal representative of the difference between the first subband signal and said estimate supplied from said multiplier.

7. The speech communication apparatus of claim 6, wherein said smoother includes means for causing said smoothed ratio to vary sharply at a rising edge of a transition of said ratio and vary slowly at a falling edge of the transition.

8. The speech communication apparatus of claim 6, wherein said division circuit includes first and second smoothers for smoothing said first and second subband signals, respectively, before said ratio is produced.

9. The speech communication apparatus of claim 8, wherein said first smoother includes means for causing said smoothed first subband signal to vary sharply at a rising edge of a transition of said first subband signal and vary slowly at a falling edge of the transition, and wherein said second smoother includes means for causing said smoothed second subband signal to vary sharply at a rising edge of a transition of said second subband signal and vary slowly at a falling edge of the transition.

10. The speech communication apparatus of claim 5, wherein each of said subband spectral shaping means comprises:
a first division circuit for producing a first ratio of said first subband signal to said second subband signal;
a second division circuit for producing a second ratio of said second subband signal to said first subband signal;
a first smoother for smoothing said first ratio when said speech activity is low or zero;
a first multiplier for multiplying the smoothed first ratio by said second ratio;
a second smoother for smoothing the output of said first multiplier;
a subtractor for subtracting integer 1 from the output of the second smoother; and
a second multiplier for multiplying said first subband signal by the output of the subtractor.

11. The speech communication apparatus of claim 10, wherein said first smoother includes means for causing said smoothed first ratio to vary sharply at a rising edge of a transition of said first ratio and vary slowly at a falling edge of the transition.

12. The speech communication apparatus of claim 10, wherein said first division circuit includes first and second smoothers for smoothing said first and second subband signals, respectively, before said first ratio is produced.

13. The speech communication apparatus of claim 1, further comprising a harmonics generator for emphasizing harmonics components of said distant signal contained in said echo replica from said echo canceller.

14. The speech communication apparatus of claim 1, wherein said echo canceller comprises:

means for dividing said residual echo into a first set of subband frequency component signals;
means for dividing said distant signal into a second set of subband frequency component signals;
an adaptive filter bank for adaptively filtering said second set of subband frequency component signals according to said first set of subband frequency component signals;
means for combining output signals of said adaptive filter bank to produce said echo replica; and
means for nullifying the first set of subband frequency component signals when said speech activity is high,
wherein said spectral shaper comprises:
a plurality of subband spectral shaping means, each of the subband spectral shaping means receiving a corresponding one of the first set of subband frequency component signals as a first subband signal, receiving a corresponding one of the output signals of said adaptive filter bank as a second subband signal, producing an estimate of a subband acoustic echo component from the first and second subband signals, and shaping the first subband signal with the estimate of the subband acoustic echo component; and
means for combining output signals of said plurality of subband spectral shaping means.

15. The speech communication apparatus of claim 14, wherein each of said subband spectral shaping means comprises:
a division circuit for producing a ratio of said first subband signal to said second subband signal;
a smoother for smoothing said ratio when said speech activity is low or zero;
a multiplier for multiplying said second subband signal by said smoothed ratio to produce said estimate of the subband acoustic echo component; and
a subtractor for producing a difference signal representative of the difference between the first subband signal and said estimate supplied from said multiplier.

16. The speech communication apparatus of claim 15, wherein said smoother includes means for causing said smoothed ratio to vary sharply at a rising edge of a transition of said ratio and vary slowly at a falling edge of the transition.

17. The speech communication apparatus of claim 15, wherein said division circuit includes first and second smoothers for smoothing said first and second subband signals, respectively, before said ratio is produced.

18. The speech communication apparatus of claim 17, wherein said first smoother includes means for causing said smoothed first subband signal to vary sharply at a rising edge of a transition of said first subband signal and vary slowly at a falling edge of the transition, and wherein said second smoother includes means for causing said smoothed second subband signal to vary sharply at a rising edge of a transition of said second subband signal and vary slowly at a falling edge of the transition.

19. The speech communication apparatus of claim 14, wherein each of said subband spectral shaping means comprises:
a first division circuit for producing a first ratio of said first subband signal to said second subband signal;
a second division circuit for producing a second ratio of said second subband signal to said first subband signal;
a first smoother for smoothing said first ratio when said speech activity is low or zero;
a first multiplier for multiplying the smoothed first ratio by said second ratio;
a second smoother for smoothing the output of said first multiplier;

a subtractor for subtracting integer 1 from the output of the second smoother; and a second multiplier for multiplying said first subband signal by the output of the subtractor.

20. The speech communication apparatus of claim 19, wherein said first smoother includes means for causing said smoothed first ratio to vary sharply at a rising edge of a transition of said first ratio and vary slowly at a falling edge of the transition.

21. The speech communication apparatus of claim 19, wherein said first division circuit includes first and second smoothers for smoothing said first and second subband signals, respectively, before said first ratio is produced.

22. A method of suppressing acoustic echo, comprising the steps of:
   a) receiving a distant signal from a far-end talker and producing acoustic energy of the distant signal from a signal output transducer;
   b) producing a near-end signal from a signal input transducer which may contain a component representing a speech activity of a near-end talker or an acoustic echo component, or both, wherein said acoustic echo component occurs as a result of the distant signal being transmitted through an acoustic echo path from the signal output transducer to the signal input transducer;
   c) producing an echo replica from both of said distant signal and from a residual echo representing a difference between said near-end signal and said echo replica by using a replica of a transfer function of said acoustic echo path and by using the residual echo as a feedback signal to produce said echo replica;
   d) receiving one of said near-end signal and said residual echo as a first input signal, receiving said echo replica as a second input signal, and estimating said acoustic echo component by modifying said echo replica; and
   e) shaping spectrum of said first input signal with the estimated acoustic echo component.

23. The method of claim 22, wherein step (d) estimates said acoustic echo component for each of a plurality of subband frequencies of audio spectrum.

24. The method of claim 22, wherein step (d) estimates said acoustic echo component from a ratio of said first input signal to said second input signal.

25. The method of claim 22, wherein step (d) estimates said acoustic echo component from a ratio of said first input signal to said second input signal for each of a plurality of subband frequencies of audio spectrum.

26. The method of claim 22, wherein step (d) comprises:
   $d_1$) dividing said first input signal into a first set of subband frequency component signals;
   $d_2$) dividing said second input signal into a second set of subband frequency component signals;
   $d_3$) receiving a corresponding one of the first set of subband frequency component signals as a first subband signal, receiving a corresponding one of the second set of subband frequency component signals as a second subband signal, producing said estimated acoustic echo component from the first and second subband signals, and shaping the first subband signal with the estimated acoustic echo component to produce an output signal;
   $d_4$) repeating step ($d_3$) for all the subband frequency component signals of said first and second sets of subband frequency component signals to produce a plurality of said output signals; and
   $d_5$) combining said plurality of said output signals.

27. The method of claim 26, wherein step ($d_3$) comprises:
   producing a ratio of said first subband signal to said second subband signal;
   smoothing said ratio when said speech activity is low or zero;
   multiplying said second subband signal by said smoothed ratio to produce said estimate of the subband acoustic echo component; and
   producing a difference signal representative of the difference between the first subband signal and said estimated acoustic echo component.

28. The method of claim 27, wherein the smoothing step causes said smoothed ratio to vary sharply at a rising edge of a transition of said ratio and vary slowly at a falling edge of the transition.

29. The method of claim 27, wherein the ratio producing step includes the step of smoothing said first and second subband signals before said ratio is produced.

30. The method of claim 29, wherein the step of smoothing the first and second subband signals causes said smoothed first and second subband signals to vary sharply at a rising edge of a transition of the first and second subband signals and vary slowly at a falling edge of the transition.

31. The method of claim 26, wherein step ($d_3$) comprises:
   $D_1$) producing a first ratio of said first subband signal to said second subband signal;
   $D_2$) producing a second ratio of said second subband signal to said first subband signal;
   $D_3$) smoothing said first ratio when said speech activity is low or zero;
   $D_4$) multiplying the smoothed first ratio by said second ratio;
   $D_5$) smoothing the multiplied smoothed first ratio;
   $D_6$) subtracting integer 1 from the multiplied first ratio smoothed by step ($D_5$) to produce a subtracted signal; and
   $D_7$) multiplying said first subband signal by said subtracted signal.

32. The method of claim 31, wherein step ($D_3$) includes the step of causing said smoothed first ratio to vary sharply at a rising edge of a transition of said first ratio and vary slowly at a falling edge of the transition.

33. The method of claim 31, wherein step ($D_1$) includes the steps of smoothing said first and second subband signals before said first ratio is produced.

34. The method of claim 22, further comprising accentuating harmonics components of said distant signal contained in said echo replica before estimating said acoustic echo component.

35. The method of claim 22, wherein step (c) comprises the steps of:
   dividing said residual echo into a first set of subband frequency component signals;
   dividing said distant signal into a second set of subband frequency component signals;
   adaptively filtering said second set of subband frequency component signals according to said first set of subband frequency component signals;
   combining the adaptively filtered signals to produce said echo replica; and
   nullifying the first set of subband frequency component signals when said speech activity is high,
   wherein step (d) comprises:
   receiving a corresponding one of the first set of subband frequency component signals as a first subband signal, receiving a corresponding one of the adaptively filtered signals as a second subband signal, and producing an estimate of a subband acoustic echo component from the first and second subband signals;

shaping the first subband signal with the estimate of the subband acoustic echo component; and combining a plurality of said shaped first subband signals.

36. The method of claim 35, wherein the shaping step comprises:
producing a ratio of said first subband signal to said second subband signal;
smoothing said ratio when said speech activity is low or zero;
multiplying said second subband signal by said smoothed ratio to produce said estimate of the subband acoustic echo component; and
producing a difference signal representative of the difference between the first subband signal and said estimate of the subband acoustic echo component.

37. The method of claim 36, wherein the smoothing step causes said smoothed ratio to vary sharply at a rising edge of a transition of said ratio and vary slowly at a falling edge of the transition.

38. The method of claim 36, wherein the ratio producing step comprises the steps of smoothing said first and second subband signals before said ratio is produced.

39. The method of claim 38, wherein the steps of smoothing the first and second subband signals cause said smoothed first and second subband signals to vary sharply at a rising edge of a transition of the first and second subband signals and vary slowly at a falling edge of the transition.

40. The method of claim 35, wherein the shaping step comprises:
$d_1$) producing a first ratio of said first subband signal to said second subband signal;
$d_2$) producing a second ratio of said second subband signal to said first subband signal;
$d_3$) smoothing said first ratio when said speech activity is low or zero;
$d_4$) multiplying the smoothed first ratio by said second ratio;
$d_5$) smoothing the multiplied smoothed first ratio;
$d_6$) subtracting integer 1 from the first ratio smoothed by step ($d_5$) to produce a subtracted signal; and
$d_7$) multiplying said first subband signal by said subtracted signal.

41. The method of claim 40, wherein step ($d_3$) includes the step of causing said smoothed first ratio to vary sharply at a rising edge of a transition of said first ratio and vary slowly at a falling edge of the transition.

42. The method of claim 40, wherein step ($d_1$) includes the steps of smoothing said first and second subband signals before said first ratio is produced.

43. The speech communication apparatus of claim 1, wherein said spectral shaper estimates said acoustic echo component by modifying the magnitude of said second input signal.

44. The speech communication apparatus of claim 43, wherein said spectral shaper modifies the magnitude of said second input signal at a rate determined based on one of said first and second input signals.

45. The speech communication apparatus of claim 44, wherein said spectral shaper determines said rate when said speech activity is low or zero.

46. The speech communication apparatus of claim 1, wherein said spectral shaper shapes said spectrum by subtracting the estimated acoustic component from said first input signal.

47. The method of claim 22, wherein step (d) comprises estimating said acoustic echo component by modifying the magnitude of said second input signal.

48. The method of claim 47, wherein step (d) comprises modifying the magnitude of said second input signal at a rate determined based on one of said first and second input signals.

49. The method of claim 48, wherein step (d) comprises determining said rate when said speech activity is low or zero.

50. The method of claim 22, wherein step (e) comprises shaping said spectrum by subtracting the estimated acoustic component from said first input signal.

* * * * *